(12) United States Patent
Chen et al.

(10) Patent No.: US 9,654,835 B2
(45) Date of Patent: May 16, 2017

(54) METHOD FOR DISPLAYING ELECTRONIC PROGRAM GUIDE, ELECTRONIC DEVICE, AND COMPUTER READABLE MEDIUM

(71) Applicant: Wistron Corporation, New Taipei (TW)

(72) Inventors: Li-Hsuan Chen, New Taipei (TW); Ching-Yuan Chuang, New Taipei (TW)

(73) Assignee: Wistron Corporation, New Taipei (TW)

( * ) Notice: Subject to any disclaimer, the term of this patent is extended or adjusted under 35 U.S.C. 154(b) by 195 days.

(21) Appl. No.: 14/151,840

(22) Filed: Jan. 10, 2014

(65) Prior Publication Data
US 2014/0304740 A1   Oct. 9, 2014

(30) Foreign Application Priority Data

Apr. 3, 2013 (TW) .............................. 102112165 A

(51) Int. Cl.
*H04N 21/482* (2011.01)

(52) U.S. Cl.
CPC ..... *H04N 21/4828* (2013.01); *H04N 21/4821* (2013.01)

(58) Field of Classification Search
CPC ....................... H04N 21/4821; H04N 21/4828
See application file for complete search history.

(56) References Cited

U.S. PATENT DOCUMENTS

| | | | | |
|---|---|---|---|---|
| 6,642,939 B1* | 11/2003 | Vallone | ............... | G06F 11/1417 348/E5.105 |
| 7,047,550 B1* | 5/2006 | Yasukawa | .......... | H04N 5/44543 348/E5.105 |
| 8,266,648 B2 | 9/2012 | Olague et al. | | |
| 2002/0129366 A1* | 9/2002 | Schein | ............... | H04N 5/44543 725/43 |
| 2008/0229361 A1* | 9/2008 | Jerding | ............... | H04N 5/44543 725/46 |
| 2009/0119713 A1* | 5/2009 | Schlarb | ............... | H04N 5/44543 725/47 |

(Continued)

FOREIGN PATENT DOCUMENTS

TW        201228386        7/2012

OTHER PUBLICATIONS

"Office Action of Taiwan Counterpart Application" with partial English translation, issued on Jun. 15, 2015, p. 1-p. 13.

(Continued)

*Primary Examiner* — Chenea Smith
(74) *Attorney, Agent, or Firm* — Jianq Chyun IP Office

(57) ABSTRACT

A method for displaying an electronic program guide (EPG), an electronic device, and a computer readable medium are provided. After a guide enable signal is received, a program database is searched according to a current channel to obtain a current category corresponding to the current channel. The program database includes a plurality of categories, each category includes a plurality of channels, and each channel includes a plurality of programs. A program menu corresponding to the current channel is displayed according to a dependence relationship between the current category, the current channel, and the programs of the current channel in the program database.

16 Claims, 7 Drawing Sheets

(56) References Cited

U.S. PATENT DOCUMENTS

2010/0319040 A1* 12/2010 Diaz Perez ............ G06Q 30/02
725/93
2012/0017243 A1* 1/2012 Reynolds ........... H04N 5/44543
725/39

OTHER PUBLICATIONS

"First Office Action of China Counterpart Application" with English translation thereof, issued on Nov. 2, 2016, p. 1-p. 11.

* cited by examiner

METHOD FOR DISPLAYING ELECTRONIC PROGRAM GUIDE, ELECTRONIC DEVICE, AND COMPUTER READABLE MEDIUM

CROSS-REFERENCE TO RELATED APPLICATION

This application claims the priority benefit of Taiwan application serial no. 102112165, filed on Apr. 3, 2013. The entirety of the above-mentioned patent application is hereby incorporated by reference herein and made a part of this specification.

BACKGROUND OF THE DISCLOSURE

1. Field of the Disclosure

The present disclosure generally relates to a technique for displaying a menu, and more particularly, to a method for displaying an electronic program guide (EPG) with a dependence relationship, an electronic device, and a computer readable medium.

2. Description of Related Art

An electronic program guide (EPG) lists TV channels and programs, so that viewers can search for channels and programs conveniently. The most popular pattern of EPG is displaying all information in a same table. An EPG is usually presented with the abscissa indicating the time and the ordinate indicating the channels, where the channels are sorted according to their numbers and can be browsed one by one.

Enriched TV programs will be brought to the viewers along with the cyberization of TV media. Not only the quantity of TV programs will increase drastically, but the categories of TV programs (for example, self-directed videos or videos collected based on keywords) will also be diversified. With such a large and diverse number of TV channels and programs, it will be too inefficient to browse these channels and programs one by one. In other words, the original EPG presentation technique does not show the viewers about the relativity between TV programs and TV channels clearly.

SUMMARY OF THE DISCLOSURE

Accordingly, the present disclosure is directed to a method for displaying an electronic program guide (EPG), an electronic device, and a computer readable medium, in which a program menu is hierarchically displayed.

The present disclosure provides a method for displaying an EPG. The method is adapted to an electronic device and includes following steps. Whether a guide enable signal is received is determined. After the guide enable signal is received, a program database is searched according to a current channel. The program database includes a plurality of categories, each of the categories includes a plurality of channels, each of the channels includes a plurality of programs, and the current channel is one of the channels. A current category corresponding to the current channel is obtained among the categories. A program menu corresponding to the current channel is displayed according to a dependence relationship between the current category, the current channel, and the programs of the current channel in the program database.

The present disclosure provides an electronic device including a storage unit and a processing unit. The storage unit includes a program database. The program database includes a plurality of categories, each of the categories includes a plurality of channels, and each of the channels includes a plurality of programs. The processing unit is coupled to the storage unit. The processing unit determines whether a guide enable signal is received. After the guide enable signal is received, the processing unit searches the program database according to a current channel to obtain a current category corresponding to the current channel among the categories, where the current channel is one of the channels. The processing unit further displays a program menu corresponding to the current channel according to a dependence relationship between the current category, the current channel, and the programs of the current channel in the program database.

The present disclosure provides a computer readable medium. The computer readable medium stores a plurality of program instructions for loading into an electronic device to execute various steps of the EPG display method described above.

As described above, a plurality of channels is categorized and different program menus are displayed according to different current channels, so that a viewer can be guided to an appropriate level of an EPG.

These and other exemplary embodiments, features, aspects, and advantages of the disclosure will be described and become more apparent from the detailed description of exemplary embodiments when read in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
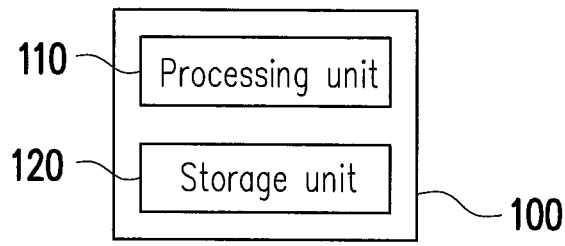
FIG. 1 is a block diagram of an electronic device according to an embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram of an electronic device according to an embodiment of the present disclosure. In the present embodiment, the electronic device 100 may be a set top box, a digital terrestrial receiver, a multimedia player, a game console, a desktop computer, a notebook computer, a tablet computer, or a smart phone. The electronic device 100 includes a processing unit 110 and a storage unit 120.

The processing unit 110 is coupled to the storage unit 120 and a receiving unit. The processing unit 110 may be a central processing unit (CPU) or any other programmable microprocessor.

The storage unit 120 may be a random access memory (RAM), a read-only memory (ROM), a flash memory, or a magnetic disk storage device. The storage unit 120 stores a plurality of code snippets. The code snippets are executed by the processing unit 110 after they are installed. The code snippets include a plurality of commands, and the processing unit 110 executes the steps of an electronic program guide (EPG) display method through these commands. In the present embodiment, the electronic device 100 has only one processing unit 110. However, in another embodiment, the electronic device 100 may include multiple processing units 110 for executing the installed code snippets.

In the present embodiment, if input is received through wireless input units, the electronic device 100 further includes a wireless receiving unit (not shown, such as an infrared receiver or a Bluetooth receiver) for receiving a guide enable signal from a wireless transmitting unit. The guide enable signal is used for enabling an EPG. However, the present disclosure is not limited thereto, and in another embodiment, the electronic device 100 may further include some wired input units (for example, a mouse and a keyboard) for receiving the guide enable signal.

Figure 2:
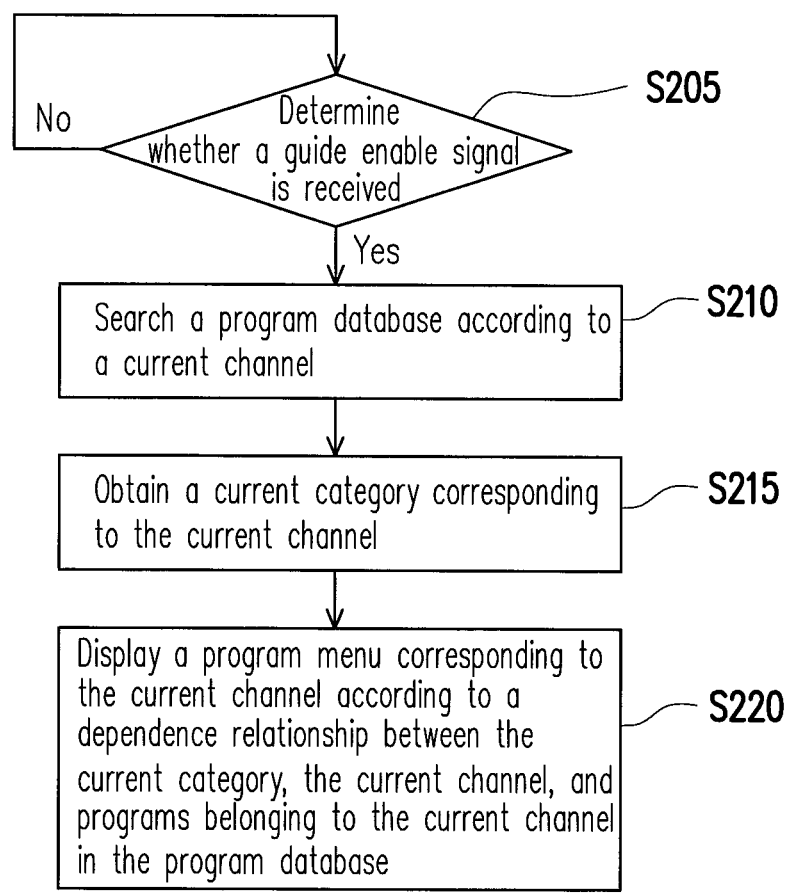
FIG. 2 is a flowchart of a method for displaying an electronic program guide (EPG) according to an embodiment of the present disclosure.

An EPG display method adopted by the electronic device 100 will be described with reference to an embodiment of the present disclosure. FIG. 2 is a flowchart of a method for displaying an EPG according to an embodiment of the present disclosure. Referring to FIG. 1 and FIG. 2, in step S205, the processing unit 110 determines whether a guide enable signal is received. If the guide enable signal is not received, step S205 is executed repeatedly. If the guide enable signal is received, step S210 is executed.

After the guide enable signal is received, in step S210, the processing unit 110 searches a program database according to a current channel. In the present embodiment, the storage unit 120 stores the program database. The program database includes a plurality of categories, each of the categories includes a plurality of channels, and each of the channels includes a plurality of programs. The current channel is one of the channels. Namely, the program database is a hierarchical database.

Figure 3:
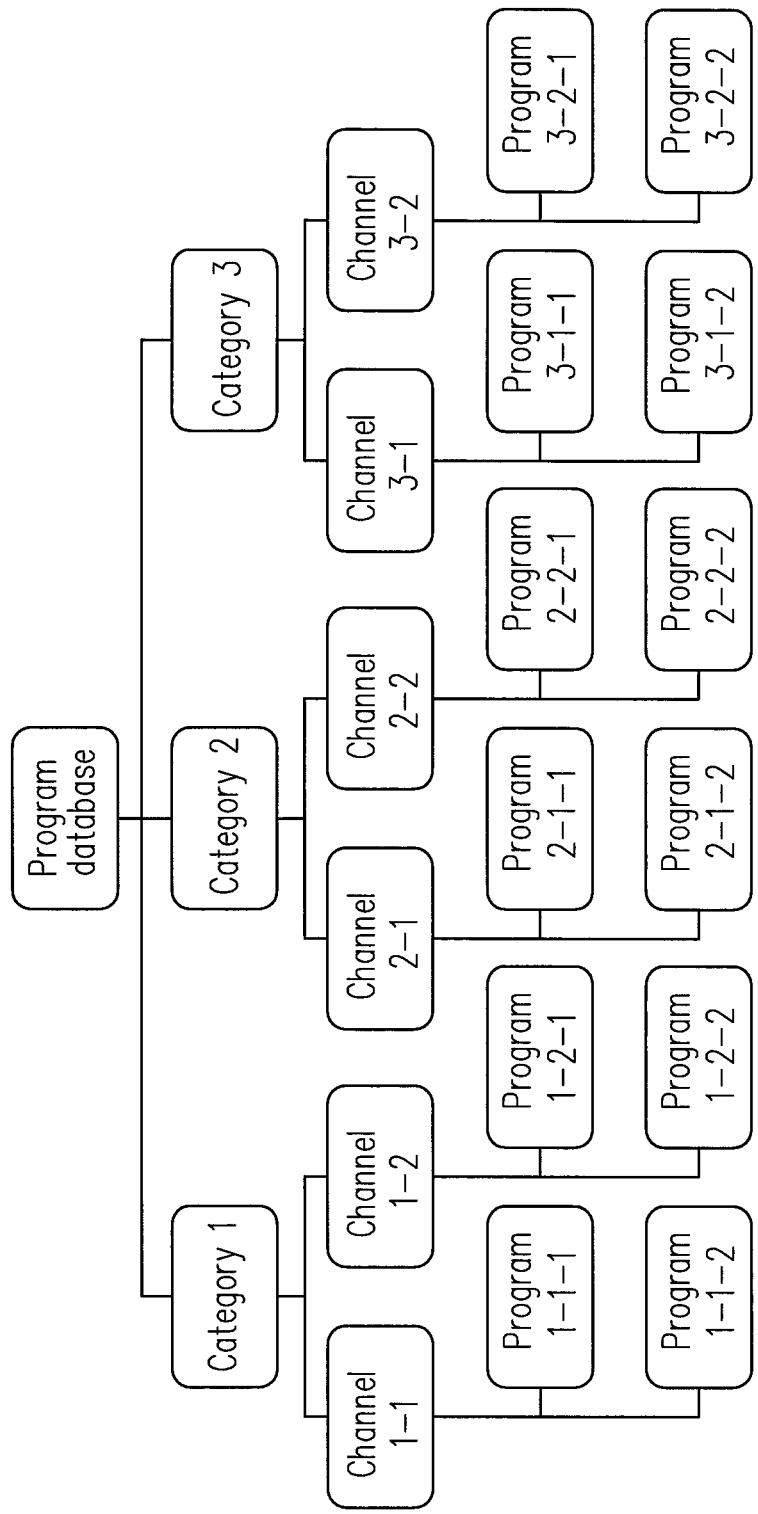
FIG. 3 is a diagram illustrating the structure of a program database according to an embodiment of the present disclosure.

FIG. 3 is a diagram illustrating the structure of a program database according to an embodiment of the present disclosure. In FIG. 3, the program database includes a category level, a channel level, and a program level. For the convenience of description, it is assumed herein that there are three categories, each category includes two channels, and each channel includes two programs. However, the number of categories, the number of channels in each category, or the number of programs in each channel is not limited in other embodiments.

Additionally, each channel may have a category tag such that the channel can be categorized conveniently. Accordingly, when the channels are imported, the processing unit 110 can automatically categorize the channels into the corresponding categories according to the category tags. The category tags are set by the suppliers of the channels or the designer of the electronic device 100, which is not limited in the present disclosure.

Referring to FIG. 2 again, in step S215, the processing unit 110 obtains a current category corresponding to the current channel among all the categories by searching the program database. For example, as shown in FIG. 3, if the current channel is "Channel 2-1", the current category corresponding to this channel found by the processing unit 110 in the program database is "Category 2".

Next, in step S220, the processing unit 110 displays a program menu corresponding to the current channel according to a dependence relationship between the current category, the current channel, and the programs of the current channel in the program database. For example, the processing unit 110 captures a branch under the current category corresponding to the current channel from the program database, generates a program menu based on this branch, and displays the generated program menu in a display unit. The display unit may be disposed in the electronic device 100 or connected with the electronic device 100 in a wired or wireless manner. However, the disposition of the display unit is not limited in the present disclosure. Additionally, a selection mark is displayed in the program menu at the position of the current channel, the current program, or the current category. The selection mark may be a highlighted frame, a check frame, or any other symbol with a marking purpose.

Figure 4A:
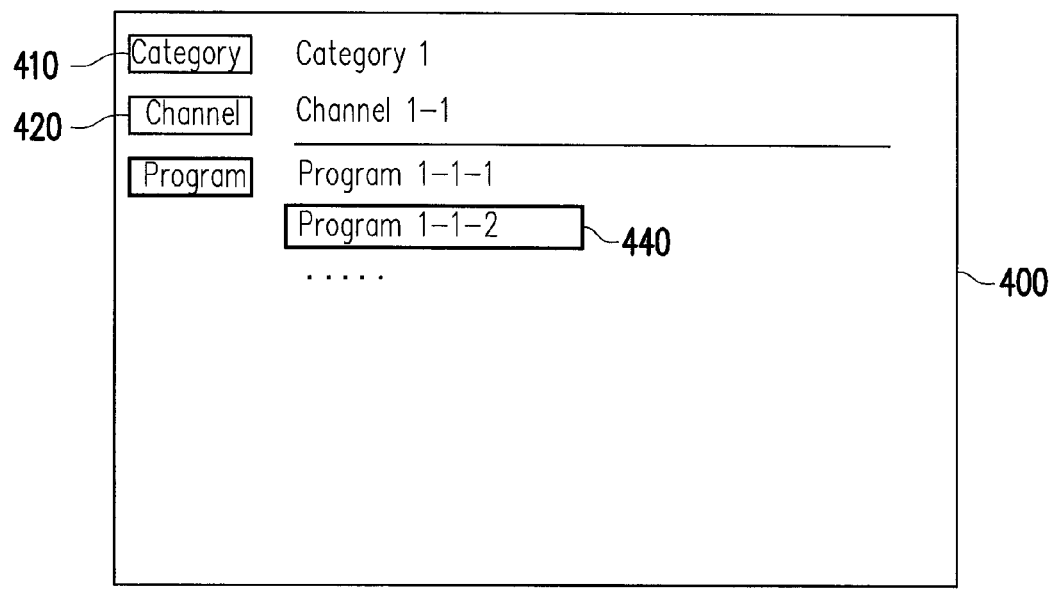
FIGS. 4A-4C are diagrams of an EPG according to an embodiment of the present disclosure.
Figure 4B:
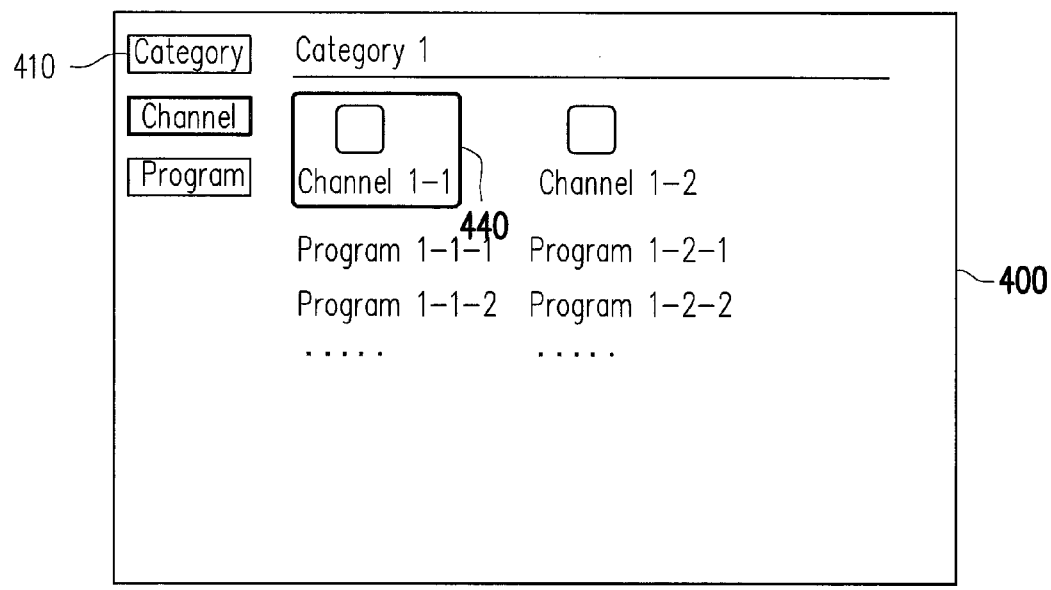
Figure 4C:
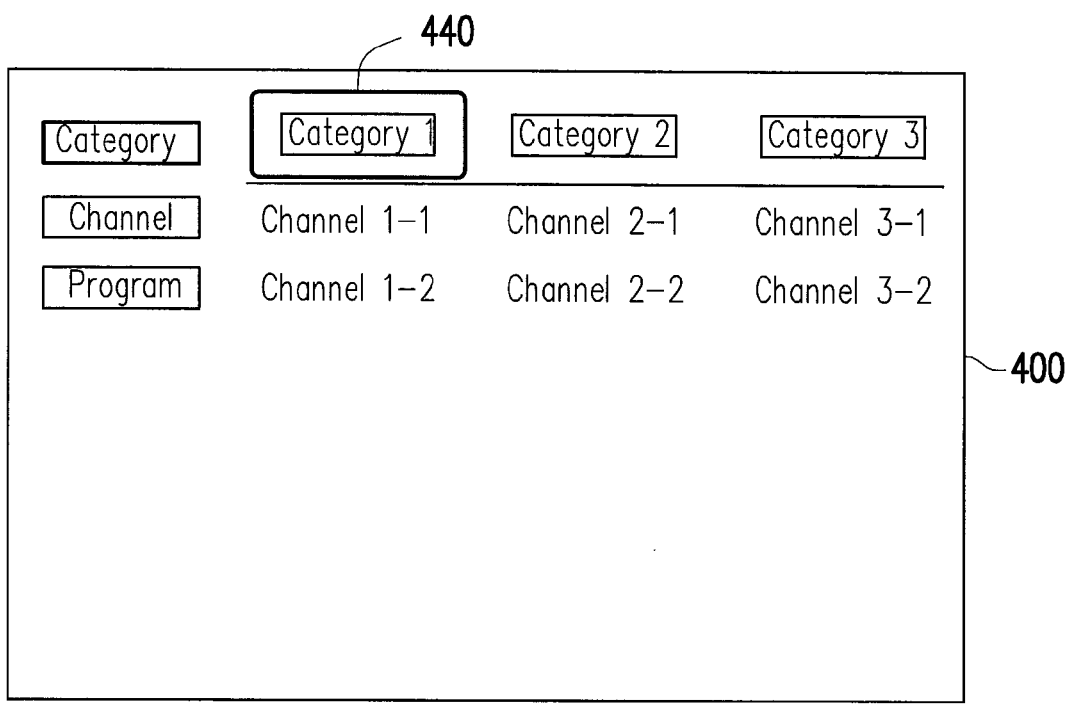

FIGS. 4A-4C are diagrams of an EPG according to an embodiment of the present disclosure. Herein it is assumed that the current channel is "Channel 1-1" in FIG. 3, the current category corresponding to "Channel 1-1" obtained by the processing unit 110 after searching the program database is "Category 1", and "Channel 1-1" includes "Program 1-1-1" and "Program 1-1-2".

FIGS. 4A-4C illustrate a display screen 400 of the display unit, where FIG. 4A illustrates a program level list, FIG. 4B illustrates a channel level list, and FIG. 4C illustrates a category level list. In the present embodiment, when the display unit is playing "Program 1-1-2" and the processing unit 110 receives a guide enable signal (for example, a user presses down a program list button on a remote control), the program level list in FIG. 4A is displayed on the display screen 400. Two functional options 410 and 420 are also displayed on the display screen 400 for respectively switching to a category level list and a channel level list.

When a program level list is displayed on the display screen 400, as shown in FIG. 4A, the processing unit 110 lists the programs belonging to "Channel 1-1" (i.e., displays "Program 1-1-1" and "Program 1-1-2"). Besides, the processing unit 110 displays a selection mark 440 at the position of the current program of the current channel in the program level list. As shown in FIG. 4A, the selection mark 440 is displayed at the position of "Program 1-1-2" (i.e., the current program).

In FIG. 4A, when the functional option 420 is enabled, the display screen 400 switches to a channel level list, as shown in FIG. 4B. In FIG. 4B, all the channels of the current category corresponding to the current channel are displayed, and the selection mark 440 is displayed at the position of the current channel in the channel level list. Namely, because "Category 1" includes two channels, in the channel level list, "Channel 1-1" and "Channel 1-2" are listed on the display screen 400, and all the programs belonging to foregoing two channels are also listed on the display screen 400. Besides, the selection mark 440 is displayed at the position of the current channel (i.e., "Channel 1-1").

When the channel level list is displayed, the processing unit 110 displays the programs belonging to each channel. Besides, when one of the programs of the current channel is selected in the channel level list, the program level list as shown in FIG. 4A is displayed, and the selection mark 440 is displayed at the position of the selected program.

In addition, when a program of another channel is selected, the processing unit 110 generates and displays another program menu according to the selected program. Moreover, when another channel is selected, the processing unit 110 generates and displays another program menu according to the selected channel. The step of displaying another program menu can be referred to steps S210-S220 in FIG. 2 and will not be described herein.

In FIG. 4A or FIG. 4B, when the functional option 410 is enabled, the processing unit 110 displays the category level list on the display screen 400, as shown in FIG. 4C. In FIG. 4C, multiple categories are displayed, and the selection mark 440 is displayed at the position of the current category in the category level list. Namely, the processing unit 110 lists all the categories (i.e., "Category 1", "Category 2", and "Category 3") in the program database and respectively lists the channels belonging to each category.

When the category level list is displayed, the processing unit 110 further displays some or all the channels belonging to each category. Additionally, when the current category (i.e., "Category 1") is selected in the category level list, the channel level list in FIG. 4B is displayed. When another category is selected, the processing unit 110 searches for a branch under the selected category in the program database to display another corresponding program menu.

Additionally, besides specific programs played at specific time, channel suppliers also provide on-demand programs which can be played at any time. Below, an example of playing an on-demand program will be described. FIGS. 5A-5E are diagrams of an EPG according to another embodiment of the present disclosure. The EPG herein has a corresponding guide channel (for example, the channel "00"). For example, the number of the guide channel may be entered to trigger the EPG, the program list button on the remote control may be pressed to trigger the EPG, or the channels are continuously switched until the guide channel may be reached to trigger the EPG. In following description, it is assumed that the number of the guide channel is entered.

Figure 5A:
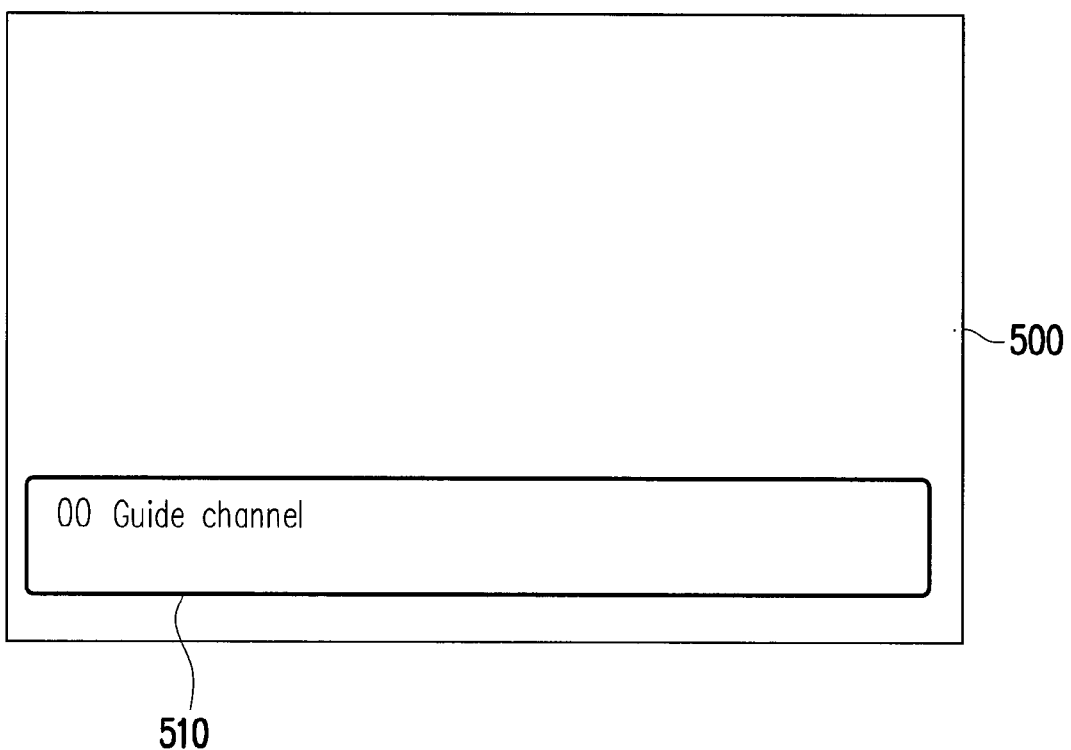
FIGS. 5A-5E are diagrams of an EPG according to another embodiment of the present disclosure.

As shown in FIG. 5A, it is assumed that a "Video 6" (i.e., the current program) of the "ABC Top Videos" of the "ABC News" (i.e., the current channel) is played on the display screen 500. When a user enters the number of the guide channel through an input unit (for example, a remote control), the processing unit 110 receives a guide enable signal. In this case, a channel information frame 510 is displayed on the display screen 500. After a predetermined duration (for example, 3 seconds), the channel information frame 510 is not displayed anymore, and the processing unit 110 searches the program database according to the current channel.

Figure 5B:
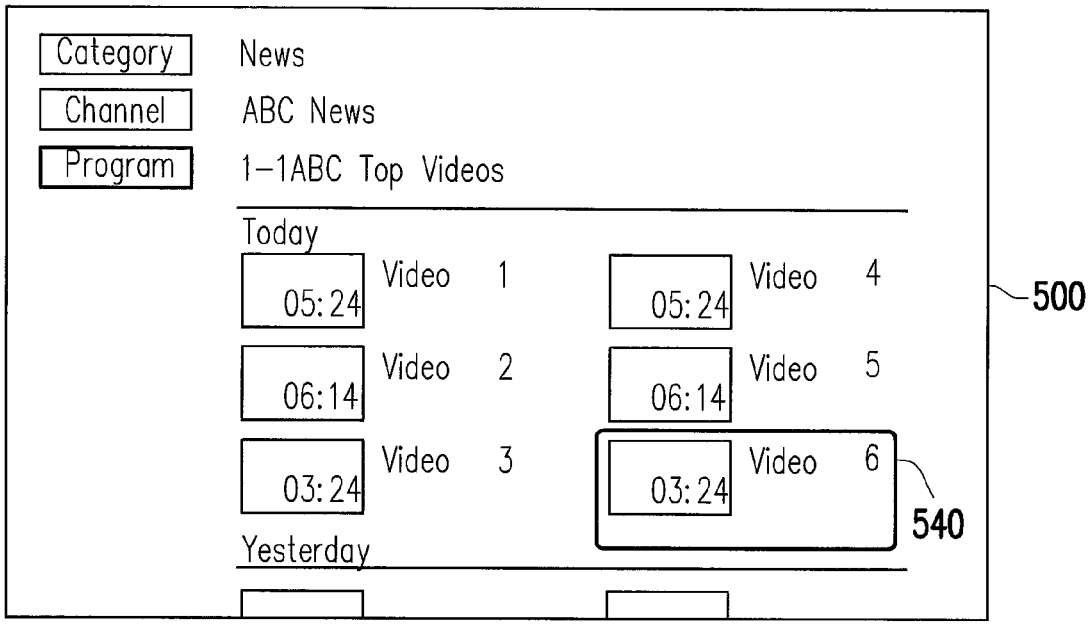

The processing unit 110 searches for the category of "ABC News" in the program database stored in the storage unit 120 to obtain the current category "News", and the processing unit 110 displays a program menu corresponding to the current channel according to the dependence relationship between the current category "News", the current channel "ABC News", and the programs of the current channel. FIG. 5B illustrates a program level list, FIG. 5C illustrates a channel level list, and FIG. 5D illustrates a category level list.

In other words, after the processing unit 110 stops displaying the channel information frame 510, the program level list is displayed on the display screen 500, as shown in FIG. 5B. Besides, a selection mark 540 is displayed at the position of "Video 6". In FIG. 5B, when the user clicks at the functional option "Channel" at top left, the channel level list is displayed on the display screen 500, as shown in FIG. 5C, and the selection mark 540 is displayed at the position of "1-1 Video 6".

Figure 5C:
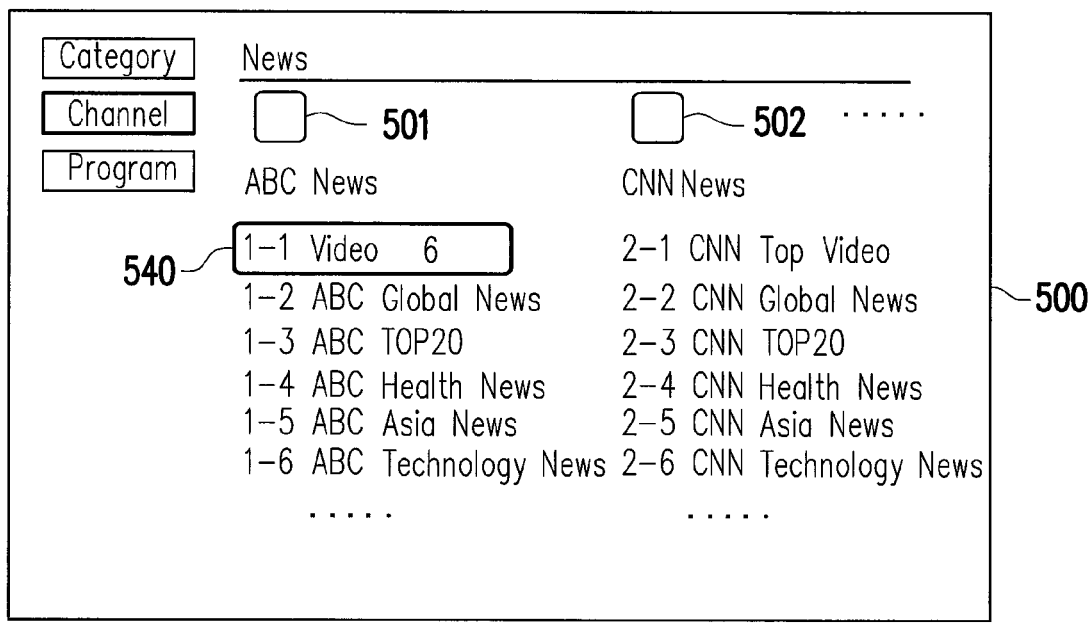
Figure 5D:
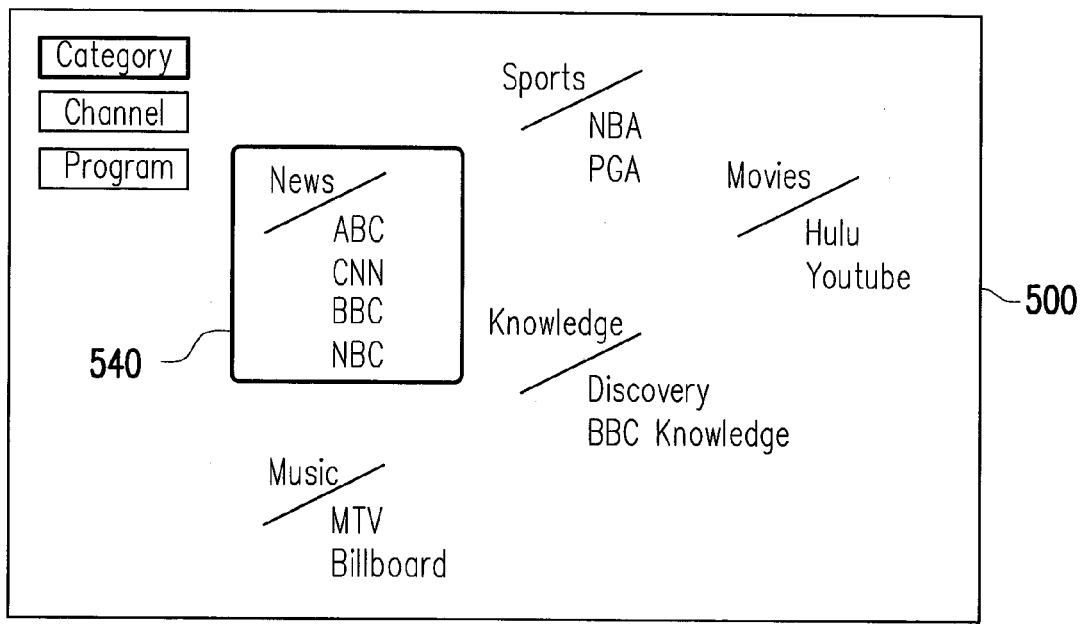
Figure 5E:
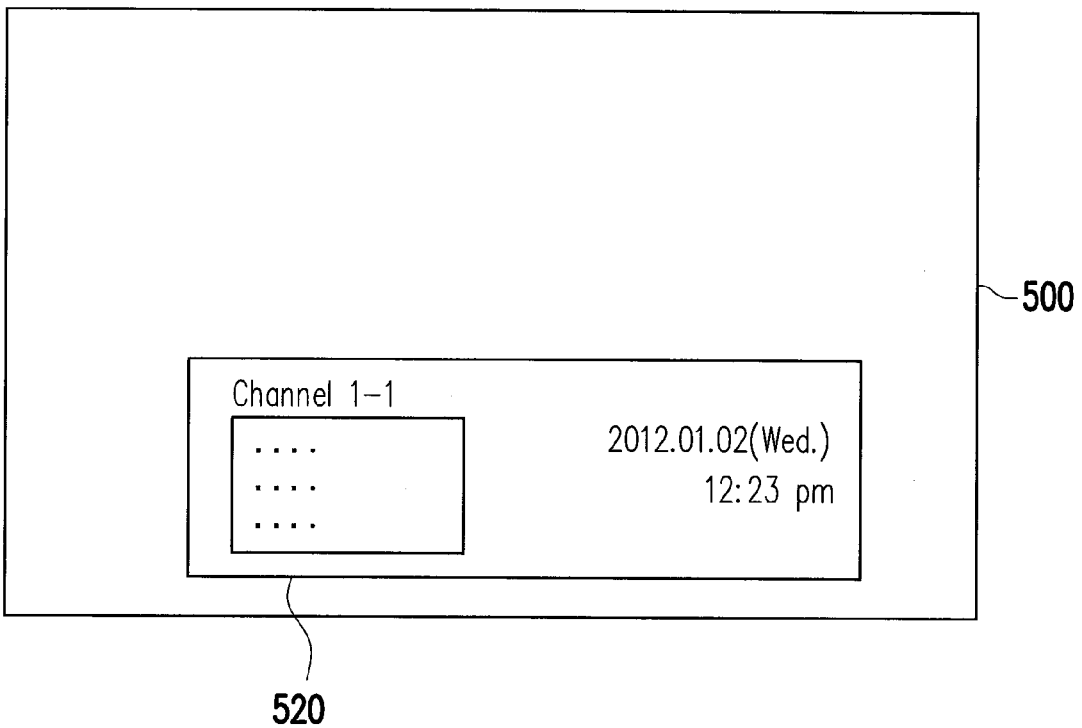

If the user clicks at the functional option "Category" at top left of FIG. 5B, the category level list is displayed on the display screen 500 (as shown in FIG. 5D), and the selection mark 540 is displayed at the position of "News". If a user clicks at "Video 6" on the display screen 500 illustrated in FIG. 5B, the content of "Video 6" is displayed on the display screen 500, and as shown in FIG. 5E, a program information frame 520 is displayed on the display screen 500. Besides, the program information frame 520 is not displayed after a predetermined duration (for example, 3 seconds), and only the content of "Video 6" is displayed.

In FIG. 5C, logos 501 and 502 corresponding to the channels are further displayed on the display screen 500. In the channel level list illustrated in FIG. 5C, if the user clicks at the functional option "Category" at the top left, the category level list in FIG. 5D is displayed on the display screen 500. When the user clicks at the current program "1-1 Video 6", the program level list in FIG. 5B is displayed on the display screen 500. In addition, in FIG. 5D, when the user clicks at the category "News", the channel level list in FIG. 5C is displayed on the display screen 500.

Figure 6A:
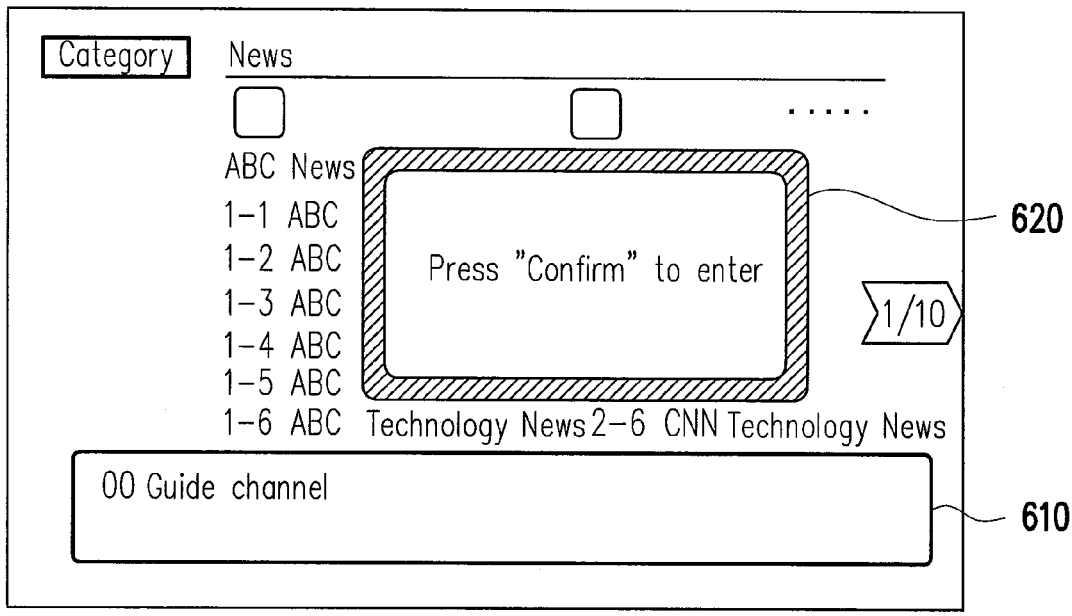
FIG. 6A and FIG. 6B are diagrams illustrating how a summary table is displayed according to an embodiment of the present disclosure.
Figure 6B:
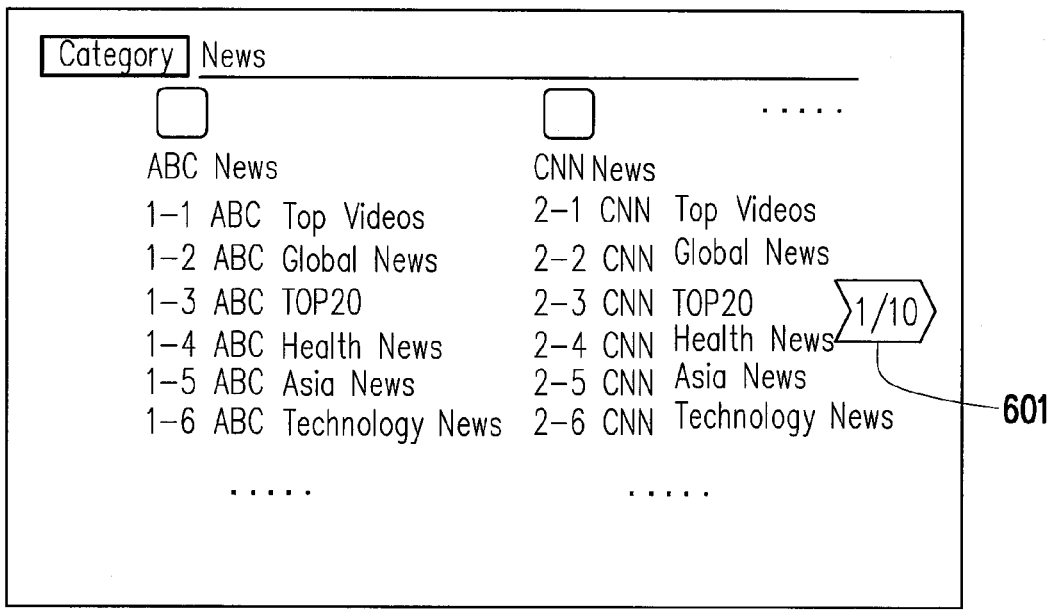

Below, another example of the present disclosure will be described, in which when the channels are continuously switched until the guide channel is reached, the processing unit 110 displays a summary table to list all the categories and the channels of each category. FIG. 6A and FIG. 6B are diagrams illustrating how a summary table is displayed according to an embodiment of the present disclosure. When a user keeps switching channels upwards or downwards until the guide channel is reached, as shown in FIG. 6A, a confirm frame 620 is displayed besides a channel information frame 610. The user is notified through the confirm frame 620 that the user has to press down the "confirm" button to enter the summary table, as shown in FIG. 6B. In FIG. 6B, all the categories and the channels belonging to each category are listed. Besides, subsequent categories can be displayed by using a page change button 601. Or, in other embodiments, the summary table is directly displayed after a while (for example, 3 seconds).

The present disclosure also provides a computer readable medium storing a plurality of program instructions for loading into an electronic device to execute the EPG display method described above. The program instructions are composed of a plurality of code snippets (for example, an organization chart establishment code snippet, a form approval code snippet, a settings code snippet, and a deployment code snippet). After these code snippets are loaded into an electronic device and executed by the same, the steps of the EPG display method described above and the functions of the electronic device can be accomplished.

As described above, in embodiments of the present disclosure, a hierarchical program menu is generated according to the structure of programs, and the generated program menu contains the dependence relationships between programs, channels, and categories, such that a contextual program menu instead of a simply sorted program menu is presented to the user. Thus, a user can find a desired program quickly and conveniently. In addition, due to the cyberization of content, an EPG is frequently updated, and a hierarchical program menu can be conveniently updated. Moreover, when a user enables an EPG from different programs, different program menus are generated according to aforementioned different programs. In other words, the user can be guided to an appropriate level of the EPG, which makes it very convenient for the user to look for a program.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for displaying an electronic program guide (EPG), for an electronic device, the method comprising:
   determining whether a guide enable signal is received;
   after the guide enable signal is received, searching a program database according to a current channel so as to obtain a current category corresponding to the current channel, wherein the program database is a hierarchical database and the program database comprises a plurality of categories, each of the categories comprises a plurality of channels, each of the channels comprises a plurality of programs, the current channel is one of the channels, and the current category is one of the categories;
   capturing a branch under the current category corresponding to the current channel from the program database, and generating a program menu based on the branch; and
   displaying the program menu corresponding to the current channel according to a dependence relationship between the current category, the current channel, and the programs of the current channel in the program database, wherein the program menu comprises a program level list, a channel level list, and a category level list;
   displaying the program level list to list the programs of the current channel, wherein displaying the program level list includes displaying the current channel, the current category, a first function option for switching to the channel level list, and a second function option for switching to the category level list;
   after displaying the program level list, when the first function option is enabled and the channel level list is switched, displaying all the channels of the current category corresponding to the current channel, and displaying the current category; and
   after displaying the program level list, when the second function option is enabled and the category level list is switched, displaying the categories.

2. The method according to claim 1, wherein the EPG has a corresponding guide channel, wherein
   when the current channel is the guide channel, a summary table is displayed to list all the categories and the channels of each of the categories.

3. The method according to claim 1, wherein after the guide enable signal is received, the method further comprises:
   executing the step of searching the program database according to the current channel after a predetermined duration.

4. The method according to claim 1, wherein the step of displaying the program menu corresponding to the current channel further comprises:
   displaying a selection nark at a position of a current program of the current channel in the program menu.

5. The method according to claim 1, wherein
   when displaying the program level list, further displaying a selection mark at a position of a current program of the current channel in the program level list;
   when the channel level list is displayed, further displaying the selection mark at a position of the current channel in the channel level list; and
   when the category level list is displayed, further displaying the selection mark at a position of the current category in the category level list.

6. The method according to claim 1, wherein when the channel level list is displayed, the method further comprises:
   displaying the programs of each of the channels; and
   when one of the programs of the current channel is selected in the channel level list, switching to the program level list;
   when one of the programs of another one of the channels is selected, displaying another program menu corresponding to the selected program.

7. The method according to claim 1, wherein when the category level list is displayed, the method further comprises:
   displaying a part of the channels of each of the categories;
   when the current category is selected in the category level list, switching to the channel level list;
   when another one of the categories is selected, displaying another program menu corresponding to the selected category.

8. The method according to claim 1, wherein each of the channels comprises a category tag, and when the channels are imported, the channels are categorized into the corresponding categories according to the category tags.

9. An electronic device, comprising:
   a storage unit, comprising a program database, wherein the program database is a hierarchical database and comprises a plurality of categories, each of the categories comprises a plurality of channels, and each of the channels comprises a plurality of programs; and
   a hardware processor, coupled to the storage unit, and determining whether a guide enable signal is received and capturing a branch under the current category corresponding to the current channel from the program database, and generating a program menu based on the branch, wherein the guide enable signal is used for enabling an electronic program guide (EPG);
   wherein after the guide enable signal is received, the hardware processor searches the program database according to a current channel to obtain a current category corresponding to the current channel among the categories, wherein the current channel is one of the channels; and the hardware processor displays a program menu corresponding to the current channel according to a dependence relationship between the current category, the current channel, and the programs of the current channel in the program database wherein the program menu comprises a program level list, a channel level list, and a category level list;
   after the guide enable signal is received by the hardware processor, the hardware processor displays the program level list to list the programs of the current channel, wherein displaying the program level list includes displaying the current channel, the current category, a first function option for switching to the channel level list, and a second function option for switching to the category level list;
   after displaying the program level list, when the first function option is enabled and the channel level list is switched, the hardware processor displays all the channels of the current category corresponding to the current channel, and displays the current category; and
   after displaying the program level list, when the second function option is enabled and the category level list is switched, the hardware processor displays the categories.

10. The electronic device according to claim 9, wherein the EPG has a corresponding guide channel, wherein
when the current channel is the guide channel, the hardware processor displays a summary table to list all the categories and the channels of each of the categories.

11. The electronic device according to claim 9, wherein after the guide enable signal is received, the hardware processor executes the step of searching the program database according to the current channel after a predetermined duration.

12. The electronic device according to claim 9, wherein the hardware processor displays a selection mark at a position of a current program of the current channel in the program menu.

13. The electronic device according to claim 9, wherein when the program level list is displayed, the hardware processor further displays a selection mark at a position of a current program of the current channel in the program level list; when the channel level list is displayed, the hardware processor further displays the selection mark at a position of the current channel in the channel level list, and when the category level list is displayed, the hardware processor further displays the selection mark at a position of the current category in the category level list.

14. The electronic device according to claim 9, wherein when one of the programs of the current channel is selected in the channel level list, the hardware processor switches to the program level list; and when one of the programs of another one of the channels is selected, the hardware processor displays another program menu corresponding to the selected program;
when the current category is selected in the channel level list, the hardware processor switches to the channel level list; and when another one of the categories is selected, the hardware processor displays another program menu corresponding to the selected category.

15. The electronic device according to claim 9, wherein each of the channels comprises a category tag;
wherein when the channels are imported, the hardware processor categorizes the channels into the corresponding categories according to the category tags.

16. A non-transitory computer readable storage medium, storing a plurality of program instructions for loading into an electronic device to execute following steps:
determining whether a guide enable signal is received;
after the guide enable signal is received, searching a program database according to a current channel so as to obtain a current category corresponding to the current channel, wherein the program database is a hierarchical database and the program database comprises a plurality of categories, each of the categories comprises a plurality of channels, each of the channels comprises a plurality of programs, the current channel is one of the channels, and the current category is one of the categories;
capturing a branch under the current category corresponding to the current channel from the program database, and generating a program menu based on the branch; and
displaying the program menu corresponding to the current channel according to a dependence relationship between the current category, the current channel, and the programs of the current channel in the program database, wherein the program menu comprises a program level list, a channel level list, and a category level list;
displaying the program level list to list the programs of the current channel, wherein displaying the program level list includes displaying the current channel, the current category, a first function option for switching to the channel level list, and a second function option for switching to the category level list;
after displaying the program level list, when the first function option is enabled and the channel level list is switched, displaying all the channels of the current category corresponding to the current channel, and displaying the current category; and
after displaying the program level list, when the second function option is enabled and the category level list is switched, displaying the categories.

* * * * *